United States Patent
Brock

Patent Number: 5,461,687
Date of Patent: Oct. 24, 1995

[54] WAVELENGTH CONTROLLED OPTICAL TRUE TIME DELAY GENERATOR

[75] Inventor: John C. Brock, Redondo Beach, Calif.

[73] Assignee: TRW Inc., Redondo Beach, Calif.

[21] Appl. No.: 853,370

[22] Filed: Mar. 18, 1992

[51] Int. Cl.$^6$ ............... G02B 6/34; G02B 6/28; H01Q 1/06
[52] U.S. Cl. ............... 385/37; 385/11; 385/16; 385/18; 385/31; 385/24; 359/123; 359/140; 372/700; 343/721
[58] Field of Search ............... 343/721, 760; 359/11, 123, 124, 140, 896, 107, 615; 372/700; 385/31, 32, 24, 27, 37, 42, 44, 18, 47, 49, 88, 89, 11, 16, 24; 342/54, 98, 168, 361, 375

[56] References Cited

U.S. PATENT DOCUMENTS

| | | | |
|---|---|---|---|
| 4,725,844 | 2/1988 | Goodwin et al. | 342/374 |
| 4,864,312 | 9/1989 | Huigvard et al. | 342/375 |
| 5,048,913 | 9/1991 | Glenn et al. | 385/37 |
| 5,066,133 | 11/1991 | Brienza | 385/37 X |
| 5,117,239 | 5/1992 | Riza | 342/375 |
| 5,210,807 | 4/1993 | Ames | 385/24 |
| 5,231,405 | 7/1993 | Riza | 342/375 |
| 5,305,009 | 4/1994 | Goutzoulis et al. | 342/157 |

*Primary Examiner*—Brian Healy

[57] ABSTRACT

A wavelength controlled optical true time delay generator (14) utilizes passive switching to direct an optical beam to different length paths depending on the input wavelength. In one embodiment a dispersive element (20) is used to reflect the input beam at different angles depending on the incident wavelength. Different optical paths are then provided for the light reflected at different angles. In another embodiment, an optical fiber (50) is provided with reflective gratings (52), each of which are reflective at different wavelengths. The gratings (52) are positioned at different lengths along the optical fiber (50) to provide for different path lengths of light reflected by the gratings and back down the optical fiber (50) to an optical output (38). The true time delay generator (14) provides for a true time delay of any length in a low loss switching mechanism which is relatively inexpensive and compact.

18 Claims, 5 Drawing Sheets

UNIFORM
FIG. 9a

RAISED COSINE
FIG. 9b

HAMMING PULSE
FIG. 9c

WAVELENGTH CONTROLLED OPTICAL TRUE TIME DELAY GENERATOR

BACKGROUND OF THE INVENTION

1. Technical Field

The present invention relates to time delay elements, and more particularly to an optical apparatus for producing variable time delays in an optical signal.

2. Discussion

The ability to provide adjustable time delay in a signal is required in many applications. For applications where the signal is a continuous wave, effective time delay can be realized by inducing a phase shift, $\phi$, in the signal of between 0 and $2\pi$ radians. Long time delays can still be achieved for a single frequency continuous wave signal by phase shifting. Any arbitrarily large phase shift is strictly equivalent to a phase shift between 0 and $2\pi$ for that specific case. However, two important classes of applications cannot use phase shifting techniques to achieve time delays corresponding to more than a few cycles. These are continuous wave signals with finite bandwidth and pulsed digital applications. For these types of applications, true time delay is necessary and phase shifting techniques will not suffice.

One method of generating true time delay in an optical signal consists of a set of optical fibers of different lengths, with a switching mechanism to select the fiber with the proper length. These types of delay generators have significant problems associated with the large insertion loss of the "one to many" switching mechanism and the large number fibers necessary for achieving a wide range of optical delay. Further, such delay units require active switching which requires active control signals and drive electronics that add to the complexity bulk and cost of the system.

One example of the use of delay elements is in RF phased array antennas. Fiber optic cable is increasingly being considered as a replacement for conventional microwave guide and coaxial cable in such feed networks because optical fiber offers a number of advantages over conventional feed networks. These advantages include lower weight and size, as well as less signal attenuation at high RF frequencies. An important feature of phased arrays is the ability to provide adjustable true time delay to the signals being fed to the various antenna elements so that the proper phasing results between these elements for all frequencies in a broad band antenna.

Phased array antennas that rely on phase shifting only, can provide the proper equivalent delay at only a single frequency, severely limiting the bandwidth capabilities of the system. Further, such phased array antennas display "squint", a phenomena where the antenna points in different directions for different frequencies within the bandwidth of the antenna.

Conventional phased antenna systems achieve time delay of the RF signal feeds by using a combination of electronic phase shifters and switching elements which select different lengths of RF waveguide sections according to the required delay time. These same methods can be carried over to fiber optic feed systems, again using electronic phase shifters for fine control (sub RF wavelength) and a fiber optic switching matrix for primary control of time delay. Optical fiber segments of different lengths are switched into each feed path as in conventional RF waveguide networks to achieve the desired time delay. However, such switching matrices have the disadvantages discussed above.

In addition to the phased array antenna application, similar problems occur in optical processors relying on coherent techniques such as phase quadrature. Phase shifters will impart the proper shift only for a limited bandwidth of frequencies. Other signal processing techniques requiring substantial time delays, such as auto correlation, will also be severely limited in bandwidth if phase-only techniques are utilized. True time delay is also essential in digital applications such as optical clock distribution in large reconfigurable electronic circuitry. Phase is not well defined in a digital pulse train unless it is of constant frequency, f. Phase shifting of such a pulse train will only work for time delays up to 1/f. Phase shifting of pulse trains is usually accomplished by true time delaying the pulse train.

Thus, it would be desirable to provide an apparatus for producing variable true time delay in an optical signal which does not require multiple optical fibers, nor active switching, and which does not have a high insertion loss. Accordingly, it would be desirable to provide a technique for producing true time delay in an optical signal which is generally passive in operation. Providing these features in an apparatus which is not limited in RF bandwidth would also be desirable. In addition, it would be desirable to provide such a true time delay element which is relatively simple, compact and inexpensive.

SUMMARY OF THE INVENTION

Pursuant to the present invention an apparatus is provided which is capable of producing true time delay in an optical signal. In a first aspect of the present invention, the apparatus comprises an input element for receiving an optical signal. A coupler includes input, output and interface points for routing the optical signal. A time delay unit is coupled to the coupler interface point for receiving the optical signal, directing it along a path, and reflecting the signal back to the coupler interface point. The time delay unit includes a dispersive element for reflecting the optical signal at an angle that is a function of the wavelength of the optical signal. The time delay unit also includes a reflecting element for reflecting the optical signal back to the dispersive element along an optical path whose length is a function of the angle. In this way the total optical path length of the signal in the time delay unit depends on its optical wavelength. A light output means is also coupled to the coupler output. In sum, the total time that it takes the optical signal to travel from the input element to the output element depends on its wavelength.

In accordance with a different aspect of the present invention, a time delay apparatus is provided in which the time delay unit comprises an optical fiber which has in-line reflective elements spaced at intervals along the fiber for reflecting light received from the coupler interface point back again to the coupler interface point. The reflective elements each substantially reflect different wavelengths, wherein different wavelengths of light travel along optical paths of different lengths. The apparatus in both aspects of the present invention can produce true time delays of any length in a passive low cost delay element with minimal signal loss.

BRIEF DESCRIPTION OF THE DRAWINGS

The various advantages of the present invention will become apparent to one skilled in the art by reading the following specification and by reference to the following drawings in which:

FIGS. 11(a)–(b) illustrate additional examples of filter profiles as a function of frequency for the Bragg grating filters in accordance with the present invention.

DETAILED DESCRIPTION OF THE PREFERRED EMBODIMENTS

Figure 1:
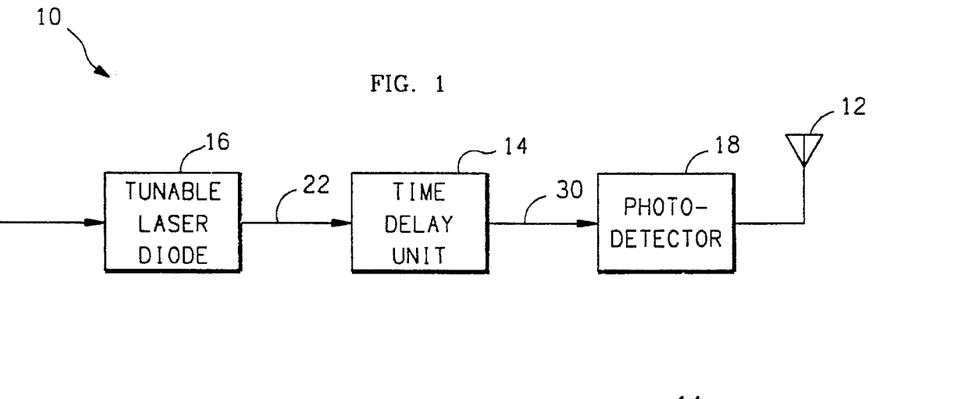
FIG. 1 is a diagram of a time delay network for use in a phased array antenna.

There is shown in FIG. 1, a feed network 10 for a phased array antenna in accordance with the present invention. The feed network 10 is used to provide adjustable true time delay to signals being fed to various antenna elements 12 so that the proper phasing results between these elements. As discussed above conventional phased array antenna systems utilize a combination of electronic phase shifters and switching systems which select different lengths of waveguide sections according to the required time delay. Alternatively, prior phased array antenna systems use fiber optic feed systems which utilize electronic phase shifters for fine control, and a fiber optic matrix for primary control of time delay. In the past this has been done by incorporating different lengths of optical fiber and switching these into the feed path to achieve the desired time delay.

In accordance with the present invention, a time delay unit 14 is a low loss, passive device which uses wavelength control of an optical laser source 16 to control the desired time delay. The output of the time delay unit consists of the properly delayed signal which is transmitted to a photo detector unit 18 which converts the optical signal back into an RF signal where it is transmitted to the proper antenna element 12. In accordance with the preferred embodiments of the present invention, the time delay unit may be constructed in three primary embodiments. The ones shown in FIG. 2, one in FIG. 3, utilize dispersive reflective elements. A third embodiment, represented in FIGS. 4–11, utilizes diffraction gratings within an optical fiber. Other various embodiments may also be utilized in accordance with the teachings of the present invention.

The tunable laser 16 may comprise a conventional tunable laser capable of producing a range of wavelengths suitable to achieve the results described in more detail below. For example, this laser may comprise the MicraLase™ manufactured by Micracor, Concord Mass. 01742 or Model TSL-80 manufactured by Santec, Saddlebrook, N.J., 07662. In addition, suitable filtering may be employed to achieve the desired wavelength bands.

Figure 2:
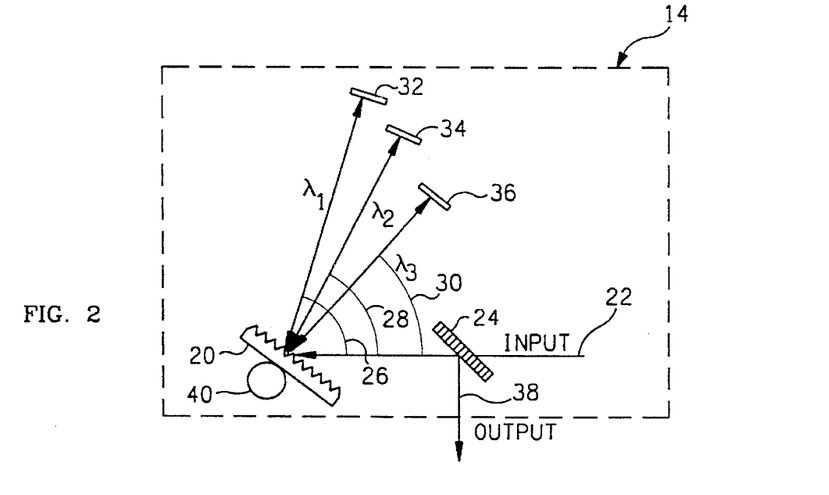
FIG. 2 is a diagram of a wavelength addressed optical time delay generator in accordance with a first embodiment of the present invention.

Referring now to FIG. 2, a first embodiment of the present invention is shown which incorporates a dispersive optical element 20. The input optical signal 22 into the time delay unit 14 passes through a beamsplitter 24 configured to transmit this input beam where it reaches a dispersive optical element 20 having a dispersive surface. For example, this may comprise a diffraction grating. Light of a first wavelength $\lambda 1$ will be dispersed by the dispersive element 20 by a first angle 26; light at a wavelength $\lambda 2$ will be dispersed and reflected at a second angle 28 and light at a wavelength $\lambda 3$ will be reflected by dispersion element 20 at a third angle 30.

Three mirror elements 32, 34 and 36 are disposed at different distances from the dispersive element 20 and also such that the light from dispersive element 20 is incident perpendicularly to them. As a result, light of wavelengths $\lambda 1$, $\lambda 2$ and $\lambda 3$ are reflected back on themselves to the dispersive element 20 but travel different distances. It will be appreciated that the three mirrors 32, 34 and 36 could be incorporated into a single appropriately shaped unit, such as a spherically shaped optical reflector to realize a continuum of optical delays with changing wavelengths. The light reflected from mirrors 32, 34 and 36 back to the dispersive element 20 also is reflected back along its original path to the beamsplitter 24. This beamsplitter 24 has a reflective surface on the side facing the dispersive element 20 to cause this light to be substantially reflected as an output beam 38, wherein it is directed out of the time delay unit and into the photo detector unit 18 shown in FIG. 1. It will be appreciated by those skilled in the art that other efficient ways of directing the beams exist, besides using beamsplitters. For example, polarization schemes, etc., may be used.

As a result, the time delay introduced by the time delay unit 14 shown in FIG. 2 between the input beam 22 and output beam 38 will be a function of the wavelength. As the wavelength of the input beam is changed the optical path it traverses will also change. The precise amount by which the beam is delayed at a particular wavelength can be altered in a number of ways. For example, a rotatable mounting 40 may be employed; in which case, by varying the angle of incidence of the input beam 22 with the dispersive element 20, the angle of reflection ($\lambda 1$, $\lambda 2$ or $\lambda 3$) can be changed for any given wavelength. Alternatively, the direction of the input beam 22 could be altered. A further alternative is to utilize a reconfigurable dispersive element 20 to permit the wavelength angle relationship to be altered. Such a reconfigurable dispersive element may be a real-time holographic element, or a conventional diffraction grating overcoated with a material whose refractive index can be modulated.

Figure 3:
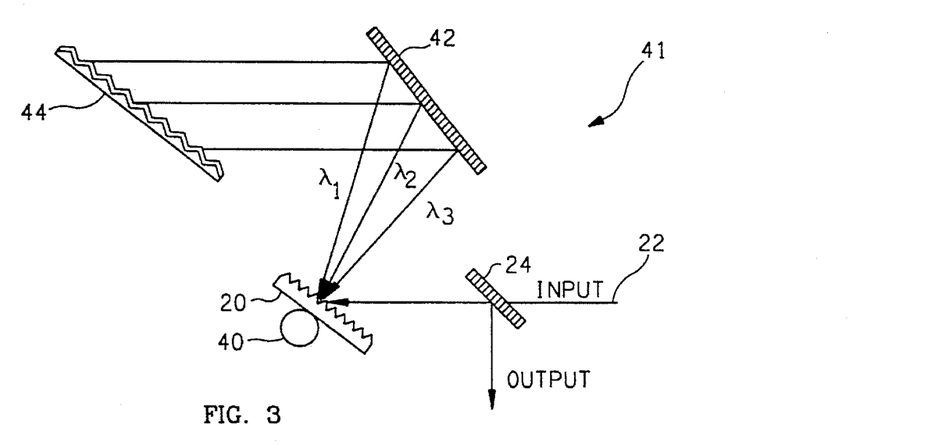
FIG. 3 is a diagram of a wavelength addressed optical time delay generator in accordance with an additional embodiment of the present invention.

Referring now to FIG. 3 a second embodiment of the time delay unit 41 in accordance with the present invention is shown. The beamsplitter 24 and dispersive element 20 are the same as in FIG. 2. However, in FIG. 3 the three mirrors 32, 34 and 36 have been replaced by a single mirror 42 which reflects the light from the three wavelength bands $\lambda 1$, $\lambda 2$ and $\lambda 3$ onto an array of retroreflectors 44 which serve to reflect light directly back from the direction of incidence. In this way, it can be seen that the path of light $\lambda 1$ as it proceeds from the dispersive element 20 to the mirror 42 to the retroreflector 44 and back again is a longer path than for light of wavelength $\lambda 3$, thereby achieving the same advantages of the first embodiment shown in FIG. 2.

Figure 4:
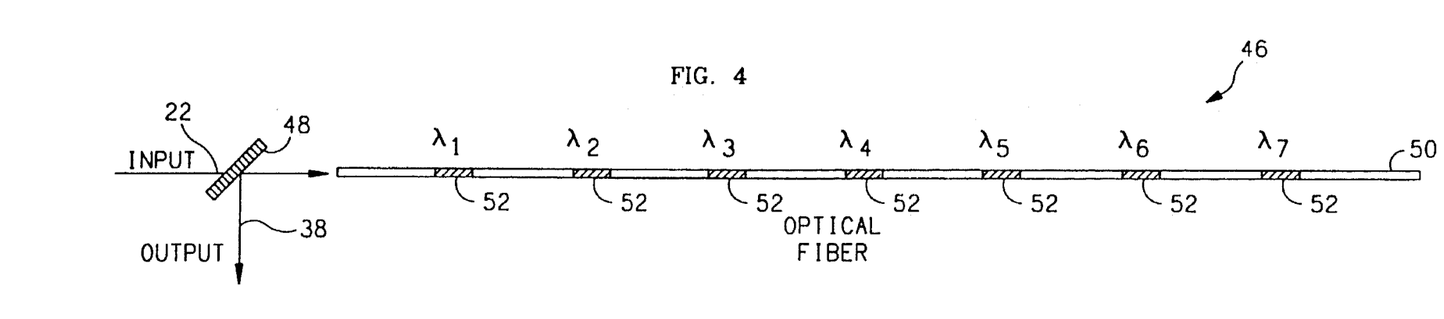
FIG. 4 is a diagram of a wavelength controlled optical time delay generator in accordance with a third embodiment of the present invention.

A third embodiment of a time delay unit 46 in accordance with the present invention is shown in FIG. 4. In this embodiment, the input beam 22 is transmitted through a beamsplitter 48 and enters an optical fiber 50. The optical fiber 50 contains a series of reflective gratings 52 spaced at intervals along the length of the fiber 50. Each of the gratings 52 are configured to be reflective at a different wavelength, designated λ1–λ7 in FIG. 4. The input optical signal 22 will be reflected from one of the gratings 52 depending on its wavelength. This will produce a time delay equivalent to 2 dn/c, where d is the distance from the fiber input to the appropriate grating 52 and n/c is the speed of light in the fiber.

In a preferred embodiment the reflective gratings 52 are very narrow band (optical) Bragg reflection filters with filter bandwidths corresponding to the desired RF bandwidth. These Bragg filters 52 are actually formed directly in the core of the optical fiber 50 so that no splices or connectors are required for the filter. By adjusting the frequency of the optical carrier at the laser source, the time delay unit 46 permits a step wise adjustable true time delay of the RF signal impressed on the laser optical carrier 16. Further, a large number of delays can be contained in a single fiber. In addition, the time delay unit 46 provides a very low loss switching mechanism to address individual delays because there is only a single coupling element.

Figure 5:
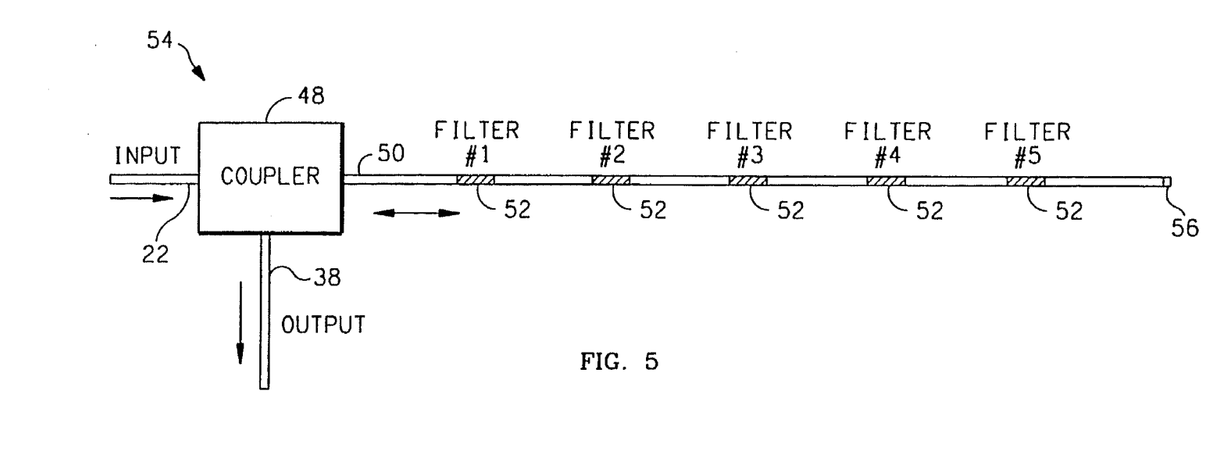
FIG. 5 is a diagram of the third embodiment of the present invention.

Referring now to FIG. 5 there is shown an additional embodiment 54 of a time delay unit in accordance with the present invention. In this embodiment, the beamsplitter 48 has been replaced by a coupler unit and the end of the optical fiber has been provided with an absorber 56. The absorber 56 prevents "ghost" reflections from the fiber end facet of the portion of the optical beam that is transmitted by the selected filter. This relaxes the reflectivity requirements of the filters, since the reflectivity can be less than 100 percent. It should be noted that the coupler unit 48 is in general a means for discriminating between the input and output signals on the delay fiber 50. It can be similar to an optical isolator in construction, except that here the reflection from the delay fiber 50 is routed to the output fiber 38 rather than being absorbed or scattered as in conventional isolator.

Figure 6:
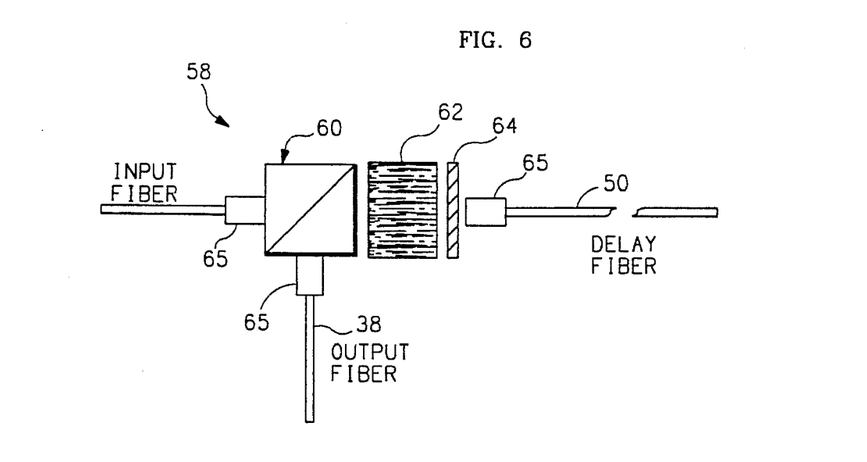
FIG. 6 is a diagram of a fourth embodiment of the present invention utilizing a polarizing beamsplitter.

Referring now to FIG. 6, a preferred embodiment of a coupler 58 is shown. This coupler 58 is based on a polarization sensitive combiner, and requires that all fiber sections be made of polarization preserving fiber. It should be noted that the Bragg reflection filters 52 themselves are not polarization sensitive. Rather, polarization is being used here as a means of separating the input and output signals on the delay line. The coupling unit 58 consists of a polarizing beamsplitter 60, a Faraday rotator 62 and a linear polarizer 64. In operation, the input optical carrier is linearly polarized and suitably oriented to pass through the polarizing beamsplitter 60, through the Faraday rotator, which rotates the plane of polarization by 45 degrees and through the second polarizer 64. Upon reflection from one of the filters 52, the beam is rotated by another 45 degrees by the Faraday rotator 62 and consequently is reflected by the polarizing beamsplitter 60 and hence, directed into the output fiber 38. A set of Grin lenses (gradient index lenses) 65 are used on each optical fiber for efficient optical coupling into the fibers.

Since polarizing beamsplitters 60 such as the one shown in FIG. 6 can be made to have nearly 100 percent throughput for both the transmitted and reflected polarizations, the overall insertion loss of the time delay element 54 can be low, determined mainly by the reflectivity of the Bragg gratings 52. This reflectivity can be over 90 percent. The coupler design 58 incorporating a Faraday rotator 62 assures very low back reflection (isolation) of the input fiber. Alternatively, the rotator 62 and second polarizer 64 could be replaced by a quarter-wave plate, producing circular polarization of the delay fiber (which would be ordinary fiber, not polarization preserving), again with linear polarization on the input and output fibers. However, random birefringence of the delay fiber in such a design (due to temperature or stress) could cause mixing of the polarization and hence, an uncontrollable amount of back reflection on the input fiber. The embodiment shown in FIG. 6 guarantees high isolation while maintaining low insertion loss.

Figure 7:
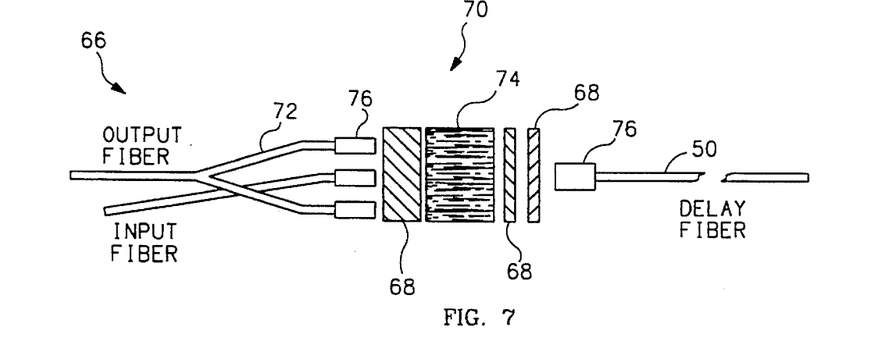
FIG. 7 is a fifth embodiment of the present invention utilizing rutile plates.

Referring now to FIG. 7 an additional embodiment of a time delay unit 66 in accordance with the present invention is shown. This embodiment is based on a polarization insensitive isolator design. Such isolators use plates of birefringent material, such as rutile plates 68, to cause the return reflected beam to be physically separated from the incident beam, with one polarization displaced upward, and the other polarization displaced downward from the incident beam. The combiner unit 70 in this case routes these two displaced beams into a Y branch combiner 72 joined to the output fiber 38, so that both reflected polarizations are once again combined on the output line. This version of the combiner is somewhat more complicated to fabricate, since it requires the Y branch combiner 72 and the birefringent plates 68. However, it offers the advantage that ordinary single mode fiber rather than polarization preserving fiber can be used throughout. Likewise, the input optical carrier can have arbitrary polarization.

The Bragg reflection filters 52 can be formed directly in the core of a continuous piece of fiber using the photo sensitive properties of germanium doped (GeO GeO$_2$) fiber. These filters 52 may be formed on optical fiber 50 using the Bragg filter generating apparatus 78 shown in FIG. 8. It has been reported that exposure to ultraviolet (UV) light in a narrow wavelength band centered about 244 nanometers, associated with an oxygen-vacancy defect in the germanium compound, will cause a permanent change in the local refractive index (see G. Meltz, W. Morey, and W. Blenn, "Formation of Bragg Gratings in Optical Fibers by a Transverse Holographic Method", Opt. Lett. 14, 823 (1989), which is hereby , incorporated by reference.) The index change can exceed 1 part in $10^4$ with reasonable exposure time and UV beam powers (eg. minutes to tens of minutes exposure time with focused beam powers of 10 milliwatts).

Figure 8:
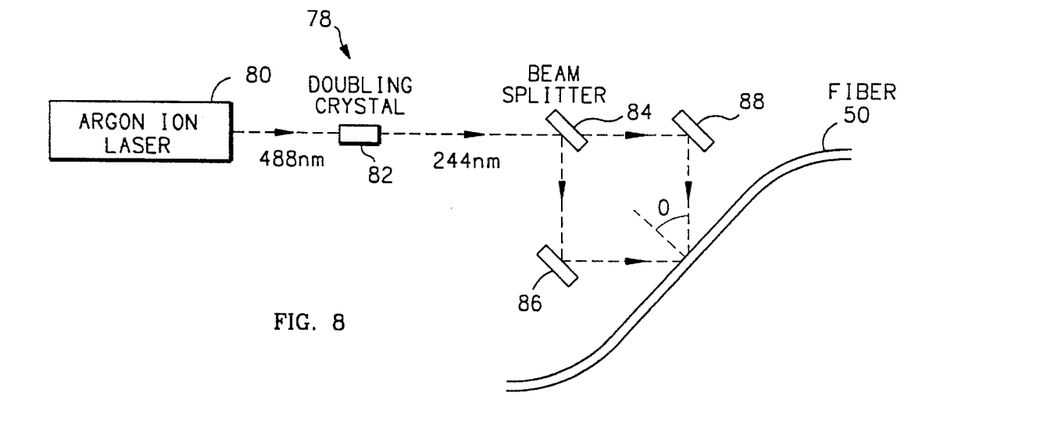
FIG. 8 is a diagram of an apparatus for producing diffraction gratings in an optical fiber in accordance with the present invention.

To form the gratings, an argon ion laser 80 at 488 nanometers wavelength passes through a doubling crystal 82 which lowers the wavelength to 244 nanometers, and a beamsplitter 84 splits the UV beam into two halves and two mirrors 86 and 88 direct these two beams through the fiber cladding and into the core of the fiber 50. An interference pattern is formed in the irradiated region of the core, forming a Brag grating profile in the refractive index. Once exposed, these gratings are permanent and stable against heating effects. By changing the exposure beam angles, the grating spacing and hence the Bragg wavelength is changed.

The basic theory of Bragg reflection gratings has been developed by Kogelnik in "Coupled Wave Theory for Thick Hologram Gratings", Bell Sys. Tech. J. 48, 2909 (1969). These results show that for gratings several millimeters long formed in the fiber core, reflection efficiency can be greater than 90 percent with induced index changes of several times $10^{-4}$. Reflection bandwidths can be less than 50 GHz. It has also been shown that reflection efficiencies greater than 50 percent and bandwidths less than 45 GHz can be achieved.

For reference, at an optical wavelength at 1.3 microns, a 100 GHz frequency bandwidths corresponds to a 0.56 nanometer wavelength bandwidth. The result for grating reflection efficiency η given a uniform grating amplitude profile, is:

$$\eta = 1/\{1 + (1-\xi^2/v^2)/\sinh^2(\sqrt{v^2-\xi^2}\,)\}$$

where $$v = j\pi n_1 d/\lambda$$

$$\xi = \Delta\lambda * \pi d/2\Lambda^2 n$$

and n=core refractive index
$n_1$=refractive index
d=grating length
λ=optical wavelength
Δλ=wavelength deviation from band center
Λ=grating line spacing At the center of the reflectivity response band (Δλ=0), this formula simplifies to $$\eta = \tanh^2(\pi f n_1 d/\lambda)$$

where the factor f has been added to represent the fraction of optical mode power contained in the fiber core.

Figure 9A:
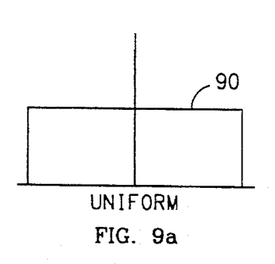
FIGS. 9(a), (b) and (c) are diagrams of alternative amplitude profiles for the Bragg gratings produced in accordance with FIG. 8.
Figure 9B:
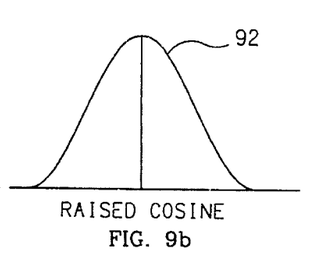
Figure 9C:
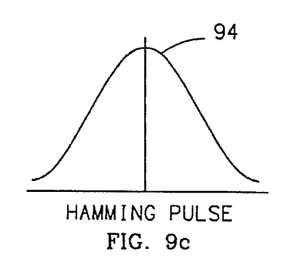

Referring now to FIG. 9, a series of diffraction grating amplitude profiles, or "tapers", 90, 92 and 94 are shown. Taper is the spatial variation of the ratio of $n_1$ to n. In order to optimize the Bragg filter reflectivity versus wavelength response, the desired type of amplitude taper must be considered because the side lobes of the filter response function can be minimized by appropriate choice (see FIGS. 10 and 11). Optimum Bragg filter response can also be achieved by introducing chirp, which is a spatial variation of Λ, the grating line spacing. Taper lowers the side lobe absolute level and increases the side lobe decay rate. Taper is generally desirable and easily obtained from taper of the exposing beam profile. Chirp widens the center lobe of the filter response, and is obtained by bending the fiber during exposure.

Figure 10:
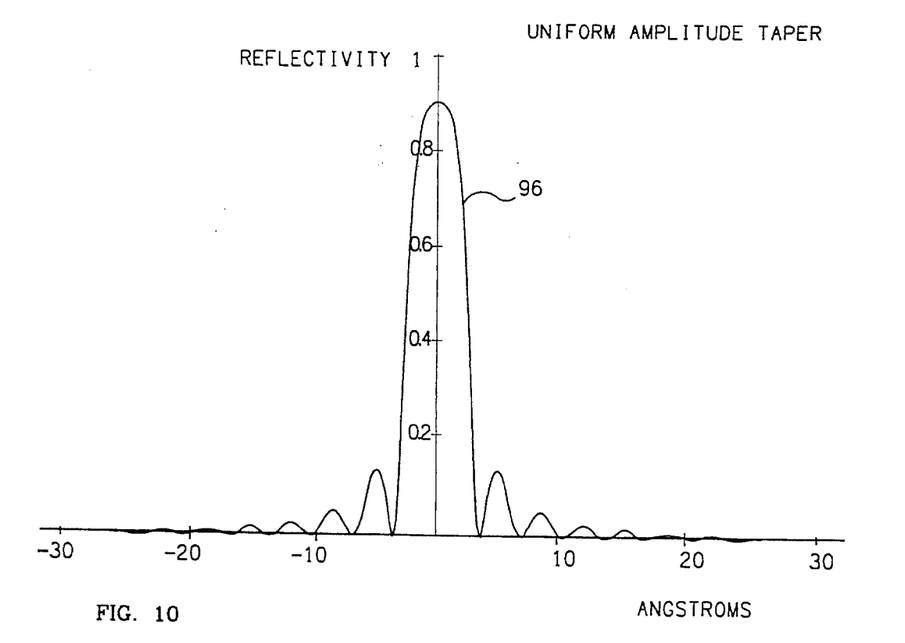
FIG. 10 is one example of a reflectivity versus wavelength curve for a Bragg filter in accordance with the present invention.
Figure 11A:
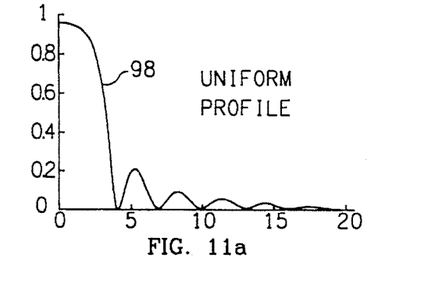
Figure 11B:
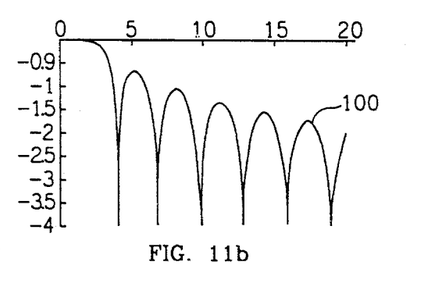
Figure 11C:
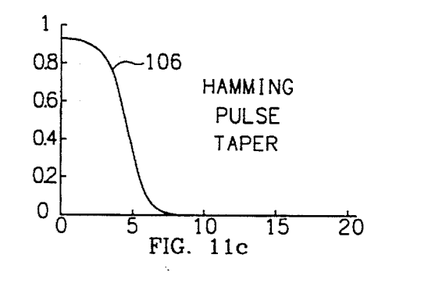
Figure 11D:
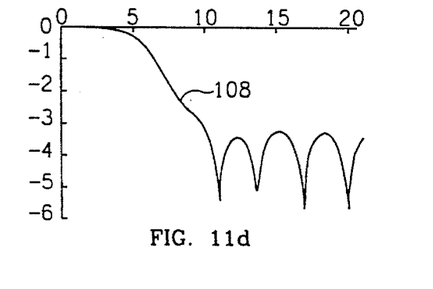
Figure 11E:
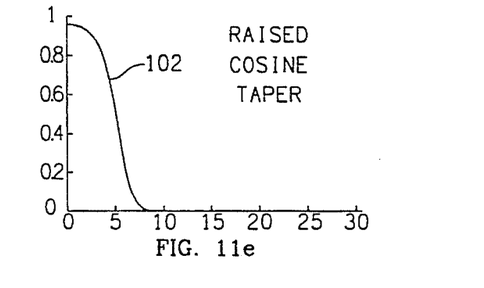
Figure 11F:
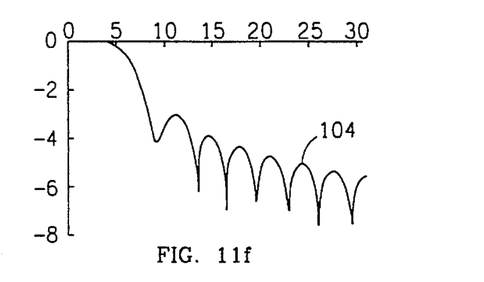
Figure 11G:
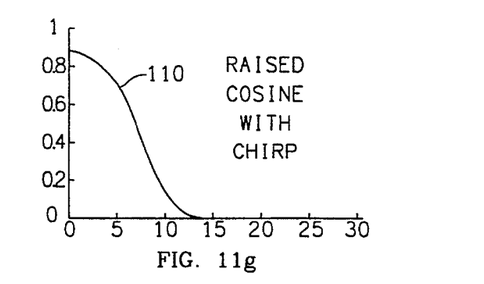
Figure 11H:
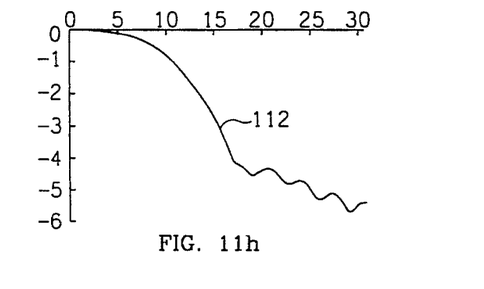

Referring now to FIG. 10, an example reflectivity response curve 96 is shown for a grating designed with a center optical wavelength of 1.3 microns and an reflection bandwidth of 100 GHz (FWHM) for a uniform amplitude taper and no chirp. The length of the grating is 1.7 millimeters and the band center reflectivity is designed to be 90 percent.

A typical laser source operating at 1.3 micron wavelength can operate on several longitudinal cavity modes, spaced about 10 angstroms apart in wavelength when free-running. One method of obtaining frequency control of the laser is to place it in a diffraction grating tuned external cavity, so that only one (adjustable) laser frequency operates at one time. Then a series of Bragg gratings could be implemented in a delay fiber with each grating designed for center wavelengths separated from each other by some offset wavelength $\lambda_0$. For example, in FIG. 5, filter number 1, 52 would be designed for a center wavelength of 1.300 microns, filter number 2 for 1,300+$\lambda_0$ microns, filter number 3 for 1.300+2$\lambda_0$ microns, etc. A value of 10 to 15 angstroms would allow adjacent filters to be approximately 100 GHz bandwidth without undue interference from side lobe reflections.

Referring now to FIG. 11, a series of graphs of frequency response for various amplitude tapers and chirp is shown. Reflectivity versus optical wavelength in angstroms is plotted in both a linear scale, curves A and a log scale curves B. Curves for a uniform profile 98, 100; raised cosine taper 102 and 104; the Hamming pulse taper 106, 108; and raised cosine with chirp 110 and 112 are shown. These curves show the ability to optimize the reflection characteristics of the grating by reducing side lobe reflections and changing the spectral width of the central lobe.

From the foregoing, it can be seen that the present invention provides a time delay unit which provides true time delay of any length, in a relatively simple and passively switched unit in which the delay time can be selected by simply changing the wavelength of the optical signal. In addition to the applications discussed, it will be appreciated that the system can be used for signal trapping or diagnosis for fiber optic networks such as telecommunication lines, cable television networks, etc. It also will find application in optical signal processors for image processing, robotic vision and optical document processors. Those skilled in the art can appreciate that other advantages can be obtained from the use of this invention and that modification may be made without departing from the true spirit of the invention after studying the specification, drawings and following claims.

What is claimed is:

1. An apparatus for producing a time delay in an optical signal, said apparatus comprising:

input means for receiving said optical signal;

optical coupler means having input, output and interface points, said optical coupler receiving said optical signal from said input means at said coupler input point, and routing it out of said coupler at said interface point, said coupler means also directing optical signals entering said interface point out of said coupler at said output point;

time delay unit coupled to said coupler interface point for directing said optical signal along a path and directing said signal back to said interface point, the time delay unit including a dispersive element for reflecting said optical signal at an angle that is a function of the wavelength of the optical signal, said time delay unit including a reflecting means for reflecting said optical signal back to said dispersive element along an optical path whose length is a function of said angle, wherein the total path length of said optical signal in said time delay unit depends on its optical wavelength; and light output means coupled to said coupler output point, whereby the total time it takes said optical signal to travel from said input means to said output means depends on its wavelength.

2. The apparatus of claim 1 wherein said dispersive element is a diffraction grating.

3. The apparatus of claim 1 wherein said reflecting means includes a plurality of mirrors spaced at different locations and distances from said dispersive element, wherein each mirror receives light reflected from said dispersive element at selected angles.

4. The apparatus of claim 1 wherein said reflecting means includes a mirror receiving light reflected from said dispersive element, and a retroreflector for reflecting light from said mirror back toward said mirror.

5. The apparatus of claim 2 wherein said diffraction grating is reconfigurable.

6. The apparatus of claim 3 wherein said reflecting means comprises a monolithic mirror of multiple mirror surfaces.

7. An apparatus for producing a time delay in an optical signal, said apparatus comprising:

input means for receiving said optical signal;

optical coupler means including input, output and interface points, said coupler means receiving said optical signal from said input means at said coupler input point and routing it out of said coupler at said interface point, said coupler means also directing optical signals entering said interface point out of said coupler at said output point;

time delay unit coupled to said coupler interface point for directing said optical signal along a path and reflecting the signal back to said interface point, the time delay unit comprising an optical fiber having reflective elements spaced at intervals along said fiber, said reflective elements reflecting light received from said interface point and back to said interface point, said reflective elements each substantially reflecting a different band of wavelengths, wherein different wavelengths of light travel optical paths of different lengths within said optical fiber;

light output means coupled to said coupler output point, whereby the total time it takes said optical signal to travel from said input means to said output means depends on its wavelength.

8. The apparatus of claim 7 wherein said coupler means includes a polarizing beamsplitter.

9. The apparatus of claim 7 wherein said coupler means includes rutile plates.

10. The apparatus of claim 7 wherein said reflector elements comprise reflective gratings.

11. The apparatus of claim 10 wherein said reflective gratings are Bragg reflective gratings formed inside said optical fiber by exposure to a plurality of ultraviolet beams.

12. The apparatus of claim 7 wherein said fiber includes an absorber at the end opposite said interface point for preventing reflections from said opposite end.

13. A feed network for a phased array antenna, said feed network comprising:

light source for converting electrical signals in said antenna feed network into optical signals, said light source capable of producing light of different wavelengths;

input means for receiving said optical signal;

coupler means including input, output and interface points, said coupler means routing said optical signal received from said input means by said coupler input point and routing it out of said coupler at said coupler interface point, said coupler means also directing optical signals entering said interface point out of said coupler at said output point;

time delay unit coupled to said coupler interface point for directing said optical signal along a path and reflecting the signal back to said interface point, the time delay unit comprising an optical fiber having reflective elements spaced at intervals along said fiber, said reflective elements reflecting light from said interface point back to said interface point, said reflective elements each substantially reflecting a different band of wavelengths, wherein different wavelengths of light travel optical paths of different lengths within said optical fiber;

light output means coupled to said coupler output point, whereby the total time it takes said optical signal to travel from said input means to said output means depends on its wavelength; and means for converting said optical signal from said light output means into an electrical signal, whereby the time that it takes an electrical signal to pass through said feed network can be varied by selecting different wavelengths for said light source.

14. The feed network of claim 13 wherein said coupler means includes a polarizing beamsplitter.

15. The apparatus of claim 13 wherein said coupler means includes rutile plates.

16. The apparatus of claim 13 wherein said reflector elements comprise reflective gratings.

17. The apparatus of claim 16 wherein said reflective gratings are Bragg reflective gratings formed inside said optical fiber by exposure to a plurality of ultraviolet beams.

18. An apparatus for producing a time delay in an optical signal, said apparatus comprising:

input means for receiving said optical signal;

optical coupler means having input, output and interface points, said optical coupler receiving said optical signal from said input means at said coupler input point, and routing it out of said coupler at said interface point, said coupler means also directing optical signals entering said interface point out of said coupler at said output point;

time delay unit coupled to said coupler interface point for directing said optical signal along a path and directing said signal back to said interface point the time delay unit including a reflective means for reflecting said optical signal as a function of the wavelength of the optical signal, wherein the total path length of said optical signal in said time delay unit depends on its optical wavelength; and light output means coupled to said coupler output point, whereby the total time it takes said optical signal to travel from said input means to said output means depend on its wavelength.

* * * * *